United States Patent Office 2,838,507
Patented June 10, 1958

2,838,507

HYDROXYALKYLPIPERAZINOALKYLHALO-
PHENOTHIAZINES

John W. Cusic, Skokie, and Robert W. Hamilton, Wilmette, Ill., assignors to G. D. Searle & Co., Chicago, Ill., a corporation of Delaware No Drawing. Application January 16, 1957
Serial No. 634,422

12 Claims. (Cl. 260—243)

This invention relates to a new group of piperazine derivatives and more particularly to hydroxyalkylpiperazinoalkylhalophenothiazines and derivatives thereof which can be represented by the general basic structural formula

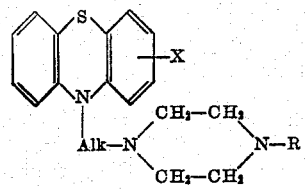

and the non-toxic salts thereof, wherein X is a halogen atom, preferably of an atomic weight less than 100, Alk is a lower alkylene radical and R is a member of the class consisting of lower hydroxyalkyl, lower dihydroxyalkyl radicals and radicals of the formula (lower alkylene)—O—R' wherein R' is a member of the class consisting of lower alkyl, lower alkenyl and phenyl radicals.

In the foregoing structural formula Alk represents a bivalent saturated aliphatic hydrocarbon radical derived from a straight or branched chain hydrocarbon such as ethylene, propylene, butylene, trimethylene, tetramethylene, and the like. In ataractic test compounds in which the group Alk contains 3 carbons seem to be the most active. The radical R can represent a hydroxylated lower alkyl radical such as hydroxyethyl, hydroxypropyl, dihydroxypropyl, hydroxybutyl, dihydroxybutyl, and the like as well as an ether radical wherein R' represents a lower alkyl, lower alkenyl and phenyl radical. Suitable lower alkyl radicals which R' can represent are the methyl, ethyl, straight and branched propyl, butyl, amyl and hexyl radicals. Suitable lower alkenyl radicals are allyl, methallyl, crotyl and the like.

The organic bases of the foregoing type form pharmaceutically acceptable non-toxic salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The piperazine derivatives of this invention have a number of valuable pharmaceutical properties. In particular, they are active anti-emetic, ataractic and sedative agents, which are relatively free from undesirable side effects which limit the therapeutic applicability of some other chlorophenothiazines. Thus therapeutic doses do not produce myosis.

The compounds of this invention are conveniently prepared by the condensation of a haloalkylhalophenothiazine of the type

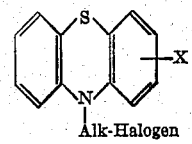

with a piperazine of the type

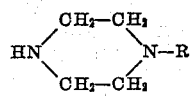

all symbols being defined as hereinabove.

An alternate method for the preparation of these compounds consists in the condensation of a compound of the structure

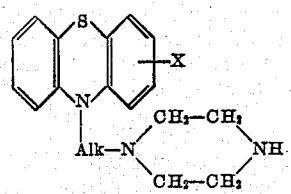

with a compound of the type halogen-R.

The invention will appear more fully from a consideration of the following examples. However, it should be understood that these examples are given by way of illustration only and that the invention is not to be construed as limited in spirit or in scope by the details set forth therein. In these examples temperatures are given uncorrected in degrees centigrade (° C.), quantities in part by weight, and pressures in millimeters of mercury.

This application is a continuation-in-part of our co-pending application Serial No. 497,809, filed March 29, 1955, now abandoned.

*Example 1*

A mixture of 155 parts of 2-chloro-10-γ-chloropropyl)-phenothiazine, 75 parts of sodium iodide, 216 parts of piperazine and 2000 parts of butanone is refluxed for 8 hours, concentrated and extracted with dilute hydrochloric acid. The extract is rendered alkaline by addition of dilute potassium carbonate and benzene or chloroform extracted. This extract is washed with water, dried over anhydrous potassium carbonate, filtered and evaporated. Vacuum distillation at 0.1 mm. pressure yields 2-chloro-10[γ-(N-piperazino)propyl]phenothiazine at about 214–218° C.

A stirred mixture of 5 parts of 2-chloro-10-[γ-(N-piperazino)propyl]phenothiazine, 1.92 parts of 2-bromoethanol, 2.11 parts of potassium carbonate and 35 parts of toluene is refluxed for 5 hours. The mixture is treated with water and benzene and the organic layer is separated, washed with water, dried over anhydrous potassium carbonate, filtered and evaporated. The residue is distilled at about 240–244° C. and 0.15 mm. pressure to yield 2-chloro - 10 - [γ - (N' - β - hydroxyethyl - N - piperazino) - propyl]phenothiazine. Treatment of an ether solution of this base with two equivalents of hydrogen chloride in 2-propanol yields crystals of the dihydrochloride. After recrystallization from ethanol this salt melts with decomposition at about 208–215° C. It has the structural formula

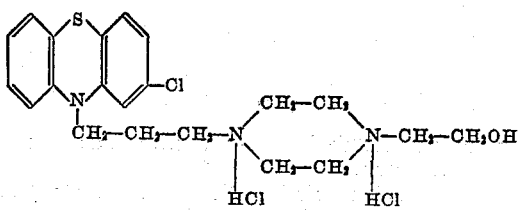

The 3-chloro and 4-chloro isomers are obtained by an analogous process. The hydrated crystals of the dihydrochloride of 3-chloro-10-[γ-(N′-β-hydroxyethyl-N-piperazino)propyl]phenothiazine melts at about 190° C.

The dihydrochloride of 4-chloro-10-[γ-(N′-β-hydroxyethyl-N-piperazino)propyl]phenothiazine thus obtained melts with decomposition at about 180° C.

*Example 2*

A mixture of 21.6 parts of 2-chloro-10-(β-chloroethyl)-phenothiazine, 15 parts of N-( -hydroxyethyl)piperazine, 5 parts of sodium iodide, 6.9 parts of potassium carbonate and 320 parts of butanone is stirred and refluxed for 8 hours and then cooled and filtered. The filtrate is concentrated to dryness and the residue is taken up in a mixture of ether and dilute aqueous sodium carbonate solution. The ether layer is separated, washed with water and extracted with dilute hydrochloric acid. This extract is washed with ether, rendered alkaline with dilute sodium carbonate and the base is extracted with ether. This ether extract is washed with water, dried over anhydrous potassium carbonate, filtered and concentrated under vacuum. The oily 2-chloro-10-[β-(N′-hydroxyethyl-N-piperazino)ethyl]phenothiazine thus obtained is taken up in hot ethanol and treated with two equivalents of hydrogen chloride in 2-propanol to yield a dihydrochloride which, recrystallized from ethanol and acetone, melts with decomposition at about 230–235° C. The same procedure can be used with the 2-chloro-10-(δ-chlorobutyl)phenothiazine to yield 2-chloro-10-[δ-(N′-β-hydroxyethyl-N-piperazino)butyl]phenothiazine which is distilled at about 270–280° C. and 0.6 mm. pressure.

*Example 3*

A mixture of 109 parts of 2-chloro-10[γ-(N-piperazino)propyl]phenothiazine, 46.3 parts of 3-bromo-1-propanol, 46 parts of potassium carbonate and 800 parts of toluene is refluxed with stirring for 5 hours and then cooled. The toluene layer is separated, washed with water, dried over potassium carbonate, filtered and concentrated to dryness. The residue is distilled at about 190–225° C. and 0.15–0.3 mm. pressure. Treatment of the distilled base in ether solution with anhydrous hydrochloric acid in 2-propanol gives the dihydrochloride of 2-chloro-10[γ-(N′-γ-hydroxypropyl-N-piperazino)propyl]phenothiazine, which is recrystallized from methanol. The salt thus obtained melts on the Fischer-Johns block at about 187–197° C. with decomposition. A capillary melting point of about 230–234° C. is obtained.

*Example 4*

A mixture of 10 parts of 2-chloro-10[γ-(N-piperazino)propyl]phenothiazine, 4.26 parts of 1-bromo-2-propanol, 4.22 parts of potassium carbonate and 70 parts of toluene is refluxed with stirring for six hours and cooled. The toluene solution is separated, washed with water, dried over anhydrous potassium carbonate and concentrated to dryness. The residue is taken up in ethanol and treated with alcoholic hydrogen chloride. On standing a precipate forms which is crystallized from ethanol to yield the dihydrochloride of 2-chloro-10-[γ-(N′-β-hydroxypropyl-N-piperazino)propyl]phenothiazine melting on the Fischer-Johns block at about 212–232° C.

The melting point in the capillary tube is about 231–234° C. The base has the structural formula

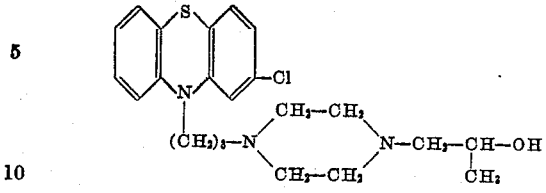

*Example 5*

A mixture of 12.5 parts of 2-chloro-10-[γ-(N-piperazino)propyl]phenothiazine, 2.23 parts of propylene oxide and 90 parts of benzene is maintained in a sealed pressure reactor at 60° C. for 16 hours. The reaction mixture is then concentrated and the residue is dissolved in ethanol. Upon treatment with 2 molecular equivalents of hydrogen chloride in 2-propanol a crystalline dihydrochloride is obtained which is repeatedly recrystallized from ethanol to yield the dihydrochloride of 2-chloro-10-[γ-(N′-β-hydroxypropyl-N-piperazino)propyl[phenothiazine which is identical with the product of the preceding example.

*Example 6*

A mixture of 7.2 parts of 2-chloro-10-[γ-(N-piperazino)propyl]phenothiazine, 2.2 parts of 4-chlorobutanol, 3 parts of sodium iodide, 1.6 parts of potassium carbonate and 80 parts of butanone is maintained in a sealed reactor at 80° C. for 20 hours. The contents of the pressure vessel are then cooled and treated with benzene and water. The organic layer is separated, washed with water, and taken to dryness. The residue is taken up in 2-propanol and treated with hydrogen chloride in 2-propanol to yield the dihydrochloride of 2-chloro-10[γ-(N′-δ-hydroxybutyl-N-piperazino)propyl]phenothiazine which melts at approximately 206–210° C., with shrinking at about 170° C. and sintering at about 190° C.

*Example 7*

A mixture of 52 parts of 3-chloro-10-[δ-(N-piperazino)butyl]phenothiazine (prepared from 3-chloro-10-(δ-chlorobutyl)phenothiazine and piperazine by the process of Example 1), 21.3 parts of 3-bromopropanol, 21 parts of potassium carbonate and 400 parts of toluene is refluxed at room temperature for 10 hours. It is then treated with water and benzene and the organic layer is separated, washed with water, dried over anhydrous calcium sulfate, filtered, and evaporated. Distillation of the residue at about 0.15 mm. pressure yields 3-chloro-10 - [δ-(N′-γ-hydroxypropyl)-N-piperazino)butyl]phenothiazine at about 220–230° C. It has the structural formula

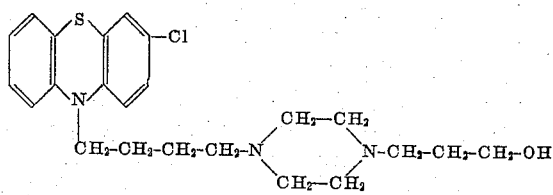

*Example 8*

13 parts of N-phenyl-4-fluoranthranilic acid are heated to about 270° C. for 90 minutes and then dissolved in ether. The ether solution is washed with 2-N sodium hydroxide and with water and then dried over anhydrous sodium sulfate. After evaporation of the ether the residue is distilled at about 0.05 mm. pressure and 70° C. to yield m-fluorodiphenylamine as a colorless oil. A mixture of 3.7 parts of this oil, 1.3 parts of sulfur and 0.1 part of iodine are heated at 180–185° C. for an hour. The residue is sublimed in vacuum and then crystallized repeatedly from ethanol to yield 2-fluorophenothiazine melting at about 200–201° C.

A solution of 217 parts of 2-fluorophenothiazine in 500 parts of ether is treated under a nitrogen atmosphere by gradual addition with 64 parts of butyl lithium in 500 parts of ether. The mixture is stirred and then treated with 263 parts of δ-chlorobutyl p-toluenesulfonate and 200 parts of ether. After an hour of stirring, there is added a solution of 180 parts of concentrated hydrochloric acid in 300 parts of water, after which the hydrolyzed mixture is filtered. The organic layer is separated from the filtrate, washed with water and concentrated to yield 2-fluoro-10-(δ-chlorobutyl)phenothiazine.

A mixture of 31 parts of this compound, 15 parts of sodium iodide, 43.2 parts of piperazine and 320 parts of butanone is refluxed for 6 hours and then concentrated. The residue is extracted with dilute hydrochloric acid. This extract is rendered alkaline by addition of dilute sodium hydroxide and extracted with hot benzene. The resulting extract is washed with water and dried over anhydrous potassium carbonate, filtered and evaporated to yield 2-fluoro-10-[δ-(N-piperazino)butyl]phenothiazine.

Treatment of this product with 3-bromo-1-propanol by the procedure of Example 3 yields the dihydrochloride of 2-fluoro-10-[δ-N'-γ-hydroxypropyl)-N-piperazino)butyl]phenothiazine.

An analogous preparation employing the γ-chloropropyl p-toluenesulfonate instead of the δ-chlorobutyl homolog and bromoethanol instead of bromopropanol in equivalent amounts yields the 2-fluoro-10-[γ-(N'-β-hydroxyethyl-N-piperazino)propyl]phenothiazine which is distilled at about 260–263° C. and 0.5 mm. pressure. The dihydrochloride melts at about 235–238° C.

Example 9

Substitution of an equivalent amount of 2-bromo-10-(γ-chloropropyl)phenothiazine in the procedure of Example 1 and successive use of equivalent amounts of the bromo derivative yields the dihydrochloride of 2-bromo-10-[γ-(N'-β-hydroxyethyl - N - piperazino)propyl]phenothiazine which melts at about 225° C.

Example 10

A mixture of 50 parts of 2-chloro-10-[γ-(N-piperazino)propyl]phenothiazine, 23 parts of β-bromoethyl ether, 21 parts of potassium carbonate and 1000 parts of anhydrous toluene is refluxed for five hours. The reaction mixture is treated with benzene and water and the organic layer is separated, dried and concentrated. The oily residue is dissolved in 2-propanol and treated with hydrogen chloride in 2-propanol. On standing a crystalline dihydrochloride of 2 - chloro-10-[γ-(N'-β-ethoxyethyl-N-piperazino)propyl]phenothiazine forms which is collected on a filter and washed with 2-propanol and then with ether. The product thus obtained melts gradually on the Fischer-Johns block with liberation of hydrogen chloride, melting being completed at about 205° C.

The 2 - chloro - 10 - [γ-(N'-β-methoxyethyl)-N-piperazino)propyl]phenothiazine is obtained by the same process. It is purified by distillation at about 250–255° C. and 0.5 mm. pressure.

Example 11

A mixture of 148 parts of 2-chloro-10-(β-chloroethyl)phenothiazine, 75 parts of sodium iodide and 1600 parts of butanone is refluxed for 2 hours. Then 216 parts of piperazine are added and refluxing is continued for 12 hours, after which the mixture is concentrated to dryness under vacuum. The residue is treated with benzene and dilute hydrochloric acid. The aqueous layer is separated, washed with benzene, rendered alkaline by addition of potassium carbonate and extracted with hot benzene. The extract is washed and dried over potassium carbonate. Filtration and concentration under vacuum yields 2-chloro-10-[β-(N-piperazino)ethyl]phenothiazine as a brownish oil.

A mixture of 91 parts of 2-chloro-10-[β-(N-piperazino)ethyl]phenothiazine, 62 parts of γ-bromopropylamyl ether, 44.5 parts of potassium carbonate and 2700 parts of anhydrous toluene is refluxed with stirring for 6 hours, cooled and treated with benzene and water. The organic layer is separated, dried over anhydrous potassium carbonate, filtered and evaporated. The residue is distilled at about 260–270° C. and 0.3 mm. pressure to yield 2-chloro - 10-[β-(N'-γ-amyloxypropyl-N-piperazino)ethyl]phenothiazine. It has the structural formula

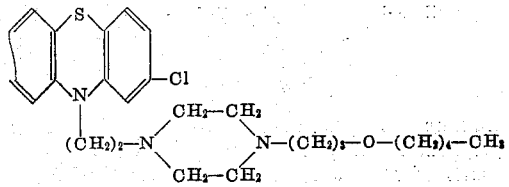

Example 12

A mixture of 50 parts of 2-chloro-10-[γ-(N-piperazino)propyl]phenothiazine, 25.3 parts of β-bromoethylallyl ether, 21.1 parts of potassium carbonate and 1000 parts of toluene is stirred and refluxed for 5 hours and then cooled. The organic layer is separated, washed with water, then taken to dryness. The oily base is dissolved in 2-propanol and treated with hydrogen chloride in 2-propanol solution. On cooling an oil forms which solidifies on standing. The dihydrochloride of 2-chloro-10-[γ-(N' - β - allyloxyethyl-N-piperazino)propyl]phenothiazine thus obtained melts with decomposition at about 207–211° C. The base has the structural formula

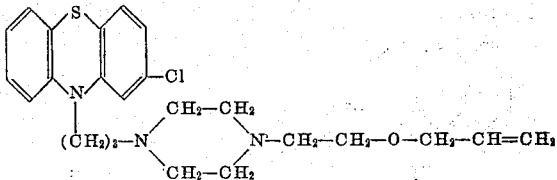

Example 13

A mixture of 100 parts of 2-chloro-10-[β-(N-piperazino)ethyl]phenothiazine, 62 parts of δ-bromobutyl methallyl ether, 44.5 parts of potassium carbonate and 2700 parts of toluene is refluxed for 6 hours under stirring and then cooled and washed with water. The organic layer is separated, dried over anhydrous potassium carbonate, filtered and evacuated. The residue is dissolved in 2-propanol and treated with anhydrous hydrogen chloride in 2-propanol. The resulting precipitate is recrystallized repeatedly from ethanol to yield the dihydrochloride of 2-chloro-10[β-(N'-δ-methallyloxybutyl-N-piperazino)propyl]phenothiazine which decomposes on heating on the Fischer-Johns block to about 220–230° C. The base has the structural formula

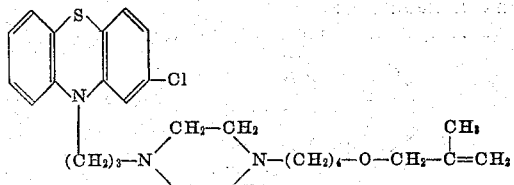

Example 14

A mixture of 5 parts of 2-chloro-10[γ-(N-piperazino)propyl]phenothiazine, 3.08 parts of β-bromoethyl phenyl ether, 2.11 parts of potassium carbonate and 120 parts of anhydrous toluene is refluxed for 6 hours with stirring and then cooled. The organic layer is separated, washed with water, dried and concentrated under vacuum. The residue is taken up in 2-propanol and treated with alcoholic hydrogen chloride. The resulting precipitate is recrystallized from ethanol to yield the dihydrochloride of 2-chloro-10[γ-(N' - β - phenoxyethyl - N - piperazino)

propyl]phenothiazine which melts on the Fischer-Johns block with decomposition at about 209–216° C. The base has the structural formula

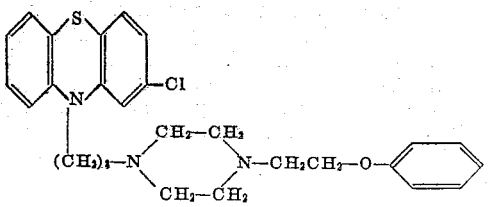

Example 15

A mixture of 25 parts of 2-chloro-10[γ-(N-piperazino)propyl]phenothiazine, 5.3 parts of potassium carbonate, 11.5 parts of sodium iodide, 8.5 parts of 3-chloro-1,2-propanediol and 220 parts of butanone is stirred at reflux for 16 hours and then treated with benzene and water. The organic layer is separated, washed with water, dried over anhydrous potassium carbonate, filtered and evaporated. The residue is treated with alcoholic hydrogen chloride. The resulting precipitate is repeatedly crystallized from ethanol to yield the dihydrochloride of 2-chloro-10-[γ-(N'-β,γ-dihydroxypropyl-N-piperazino)propyl]phenothiazine melting at approximately 209–218° C.

Use of an equivalent amount of 2-bromo-10-[γ-(N-piperazino)propyl]phenothiazine instead of the 2-chloro derivative yields 2-bromo-10-[γ-(N'-β,γ-dihydroxypropyl-N-piperazino)propyl]phenothiazine of the structural formula

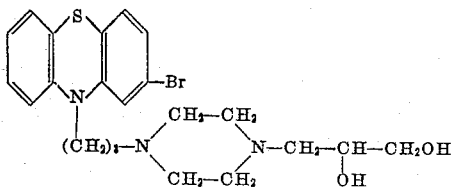

Example 16

A stirred mixture of 25 parts of 2-chloro-10-[β-(N-piperazino)propyl]phenothiazine, 5.3 parts of potassium carbonate, 11.5 parts of sodium iodide, 9.6 parts of 4-chloro-1,3-butanediol and 250 parts of butanone is refluxed for ten hours, cooled and treated with benzene and water. The organic layer is separated, washed with water, dried, filtered and evaporated. The residual oil is dissolved in ethanol and then treated with alcoholic hydrogen chloride to yield the dihydrochloride of 2-chloro-10-[β-(N'-β,δ-dihydroxybutyl-N-piperazino)propyl]phenothiazine which decomposes on heating on the Fischer-Johns block to about 215–225° C.

What is claimed is:

1. A compound of the structural formula

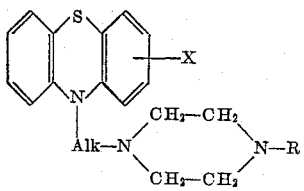

wherein X is a halogen atom of atomic weight less than 100, Alk is a lower alkylene radical of two to four carbon atoms, and R is a member of the class consisting of lower hydroxyalkyl radical in which the hydroxy group is at least 2 carbon atoms removed from the nitrogen atom closest thereto, lower dihydroxyalkyl radicals in which the hydroxy groups are at least 2 carbon atoms removed from the nitrogen atom closest thereto, phenyloxy-(lower)alkyl radicals, lower alkenyloxy-(lower)alkyl radicals and lower alkyloxy-(lower)alkyl radicals.

2. A compound of the structural formula

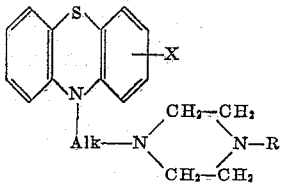

wherein X is a halogen atom of atomic weight less than 100, Alk is a lower alkylene radical of two to four carbon atoms and R is a lower dihydroxyalkyl radical in which the hydroxy groups are at least 2 carbon atoms removed from the nitrogen atom closest thereto.

3. A compound of the structural formula

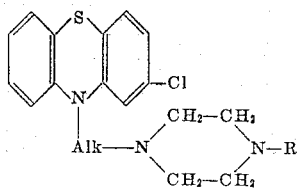

wherein Alk is an alkylene radical of three carbon atoms and R is a lower dihydroxyalkyl radical in which the hydroxy groups are at least 2 carbon atoms removed from the nitrogen atom closest thereto.

4. 2-chloro - 10 - [γ-(N'-β,γ-dihydroxypropyl-N-piperazino)propyl]phenothiazine.

5. A compound of the structural formula

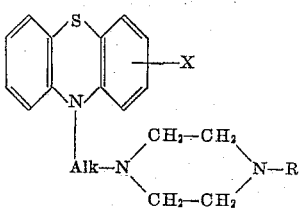

wherein X is a halogen atom of atomic weight less than 100, Alk is a lower alkylene radical of two to four carbon atoms and R is a lower hydroxyalkyl radical, in which the hydroxy groups are at least 2 carbon atoms removed from the nitrogen atom closest thereto.

6. A compound of the structural formula

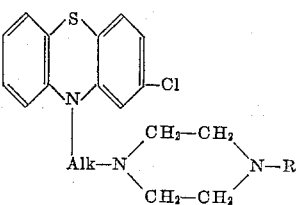

wherein Alk is a lower alkylene radical of three carbon atoms and R is a lower hydroxyalkyl radical, in which the hydroxy groups are at least 2 carbon atoms removed from the nitrogen atom closest thereto.

7. 2-chloro-10-[γ-(N'-β-hydroxyethyl - N - piperazino)propyl]phenothiazine.

8. 2-chloro - 10 - [γ-(N'-hydroxypropyl-N-piperazino)propyl]phenothiazine.

9. A compound of the structural formula

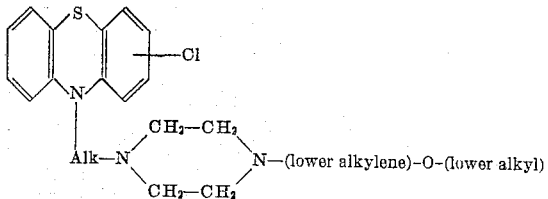

wherein Alk is a lower alkylene radical of two to four carbon atoms.

10. 2-chloro-10-[γ - (N'-β-methoxyethyl-N-piperazino) propyl]phenothiazine.
11. A compound of the structural formula
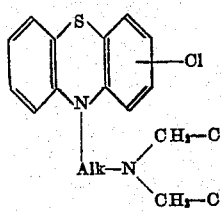
wherein Alk is a lower alkylene radical of two to four carbon atoms.
12. A compound of the structural formula
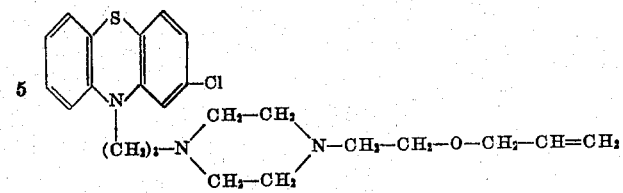
References Cited in the file of this patent
FOREIGN PATENTS
203,708    Australia _____ Oct. 20, 1955